Patented Oct. 1, 1929

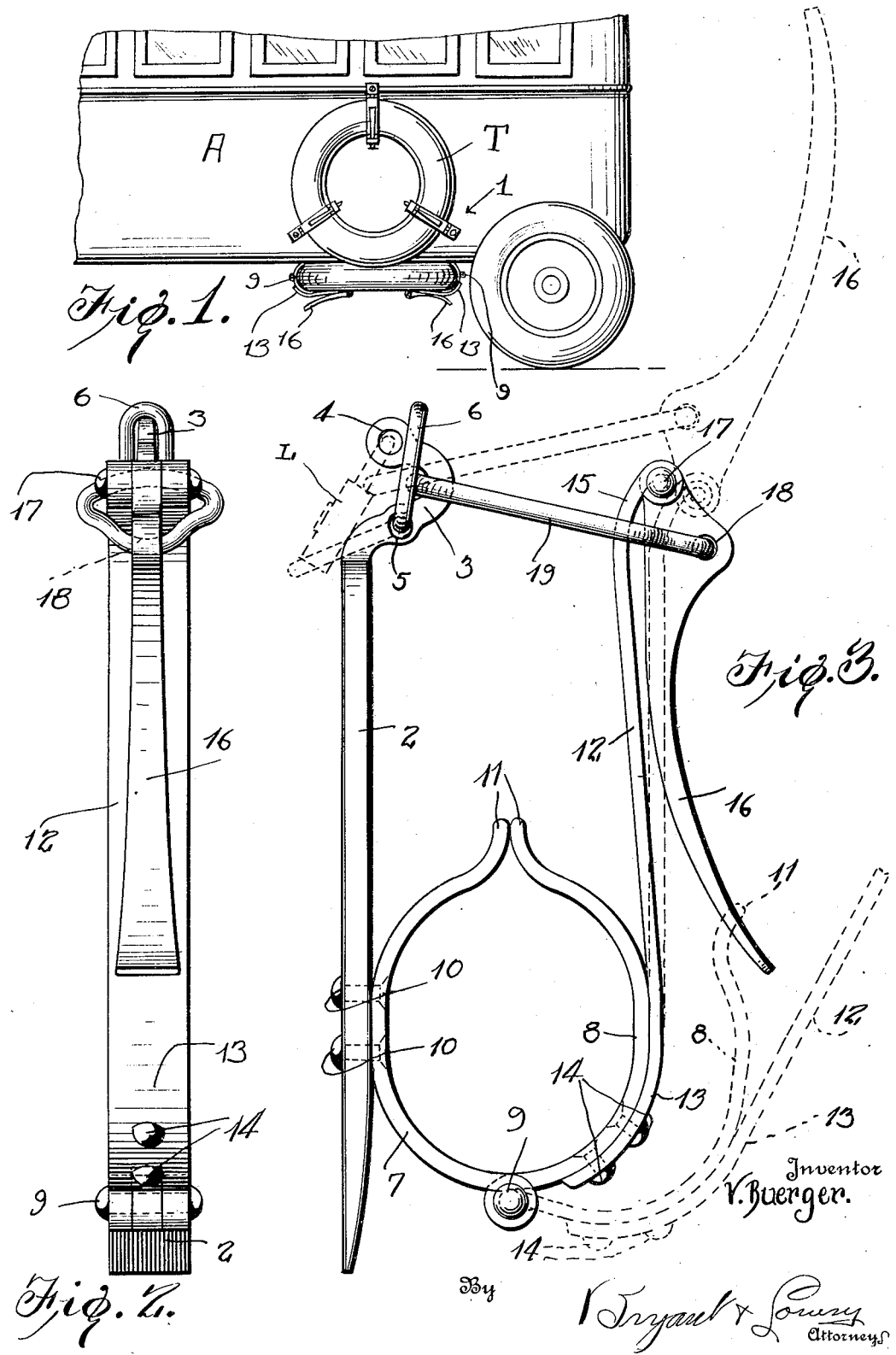

1,730,121

UNITED STATES PATENT OFFICE

VINCENT BUERGER, OF CHEBOYGAN, MICHIGAN

SPARE-TIRE CARRIER

Application filed May 13, 1926. Serial No. 108,929.

This invention relates to certain new and useful improvements in spare tire carriers and has for its primary object to provide a tire carrier in the form of a plurality of independently operable clamping members for engaging and supporting a spare tire either upon a side wall of an automobile body or to be under-slung with respect to said body.

A further object of the invention is to provide a spare tire carrier in the form of a clamping device wherein a rigid bracket arm is permanently attached to the automobile body with one hinged section of a clamp fixed thereto and with the other hinged section of the clamp carried by a spring arm with a latch device for holding the clamp in its tire supporting position.

With the above and other objects in view that will become apparent as the nature of the invention is better understood, that same consists of the novel form, combination and arrangement of parts hereinafter more fully described, shown in the accompanying drawing and claimed.

In the drawing, wherein like reference characters designate corresponding parts throughout the several views, Figure 1 is a fragmentary side elevational view of a motor vehicle showing a spare tire carrier comprising the spaced clamping member for supporting a spare tire on either the side wall of the automobile body or beneath the same, Figure 2 is an edge elevational view of the carrier, and Figure 3 is a side elevational view of the same in its closed tire supporting position as illustrated by full lines and in its releasing position as illustrated by dotted lines.

It being understood that the spare tire T shown in Fig. 1 may be either carried upon the side of the automobile body A or under-slung with respect thereto, the spare tire carrier is in the form of a series of independent carrier supporting and clamping devices generally designated by the reference 1, three of such devices being illustrated in Fig. 1, and as shown more clearly in Fig. 3 comprising a rigid bracket arm 2 that may be permanently attached to a convenient part of the automobile body A in any suitable manner. One end of the bracket arm 2 carries a downwardly offset hook 3 having an eye 4 in its terminal end and an opening 5 intermediate the ends thereof adjacent the bracket arm 2 for pivotally supporting the closed link 6 for purposes hereinafter to appear.

A pair of tire clamping arms 7 and 8 are associated with the bracket arm 2 and when in closed clamping arrangement as shown in Fig. 3 form a closed loop, the clamping arms 7 and 8 being hinged together as at 9 with the clamping arm 7 secured intermediate its ends to the lower side of the bracket arm 2 as at 10. The free ends 11 of the clamping arms 7 and 8 are separated to permit positioning of the tire between the clamping arms.

A relatively long spring arm 12 of a length substantially coincident to the bracket arm 2 has one end thereof curved as at 13 for intimate contact with the clamping arm 8 and is permanently secured thereto as at 14, the other or free end 15 of the spring arm 12 being disposed beneath the hook 3.

A latch lever 16 is pivoted as at 17 to the free end 15 of the spring arm 12 and has an opening 18 formed therein adjacent the pivot 17 for the reception of the relatively long link 19.

In positioning the tire T in the carrier members, the spring arm 12 carrying the latch lever 16 and the link 19 together with the clamping arm 8 are moved upon the pivotal connection 9 between the clamping arms 7 and 8 to permit ready access to the space between the clamping arms for the positioning of the tire, and when the tire is so disposed, the spring arm 12 is moved to cause the arms 7 and 8 to engage the opposite sides of and inclose the tire. In this position, the latch lever 16 is at the dotted line position shown in Fig. 3 which will permit the free end of the link 19 to be engaged with the hook 3. Upon swinging the latch lever 16 upon its pivotal support 17, the clamping arms 7 and 8 are moved into binding engagement with the tire T, and when the point of connection between the latch lever 16 and link 19 is moved to the opposite side of the pin 17, the resiliency of the spring arm 12 will retain the latch lever 16 in the full line position shown in Fig. 3. When so disposed, the tire is securely clamped within the holder and to prevent unauthorized removal thereof, the link 6 is moved into inclosing relations with the eye 4 at the outer end of the hook 3 and through which eye the shackle of a lock L shown by dotted lines in Fig. 3 is positioned.

What is claimed as new is:

A spare tire carrier comprising a pair of similar clamping arms hinged directly together with their free ends introcurved and adapted to come into close relation over a tire, and to be separable, a bracket arm rigidly secured to one of said clamping arms and formed at one end with a hook terminating in an eye for the attachment of a padlock, and with an opening for the reception of a closed link, a closed link inserted in said opening, a long spring arm rigidly secured to the other clamping arm, a lever pivoted to the free end of said spring arm, and a link connecting the short arm of said lever with the hook on the end of the said bracket arm.

In testimony whereof I affix my signature.

VINCENT BUERGER.